United States Patent
Lin et al.

(10) Patent No.: US 11,823,496 B2
(45) Date of Patent: Nov. 21, 2023

(54) PROFESSIONAL DANCE EVALUATION METHOD FOR IMPLEMENTING HUMAN POSE ESTIMATION BASED ON DEEP TRANSFER LEARNING

(71) Applicant: Kuo-Yi Lin, Taichung (TW)

(72) Inventors: Kuo-Yi Lin, Taichung (TW); Fuh-Jiun Hwang, Taoyuan (TW)

(73) Assignee: Kuo-Yi Lin, Taichung (TW)

( * ) Notice: Subject to any disclaimer, the term of this patent is extended or adjusted under 35 U.S.C. 154(b) by 271 days.

(21) Appl. No.: 17/313,067

(22) Filed: May 6, 2021

(65) Prior Publication Data
US 2022/0358310 A1    Nov. 10, 2022

(51) Int. Cl.
*G06V 40/20* (2022.01)
*G06N 3/08* (2023.01)
(Continued)

(52) U.S. Cl.
CPC ............... *G06V 40/23* (2022.01); *G06N 3/08* (2013.01); *G06T 7/75* (2017.01); *G06V 20/46* (2022.01);
(Continued)

(58) Field of Classification Search
CPC ........ G06V 10/82; G06V 20/46; G06V 10/25; G06V 40/20; G06V 10/751; G06V 20/49;
(Continued)

(56) References Cited

U.S. PATENT DOCUMENTS 10,529,137 B1 *    1/2020   Black ................... G06V 10/255
2012/0214594 A1 *  8/2012   Kirovski ............... A63F 13/814
                                                        463/36
(Continued)

FOREIGN PATENT DOCUMENTS

CN    109241909 A  *  1/2019   ......... G06K 9/00342
CN    109508656 A  *  3/2019
(Continued)

OTHER PUBLICATIONS

Mehta VNect: Real-time 3D Human Pose Estimation with a Single RGB Camera May 2017 (Year: 2017).*
(Continued)

*Primary Examiner* — Nizar N Sivji
(74) *Attorney, Agent, or Firm* — Demian K. Jackson; Jackson IPG PLLC

(57) ABSTRACT

The present invention provides a professional dance evaluation method for implementing Human Pose Estimation based on Deep Transfer Learning. First of all, the Transfer Learning principle of deep learning is combined with the pose features of professional dance training to build a Human Pose Estimation model. Afterwards, the video of demonstration dancing actions is collected and imported into the Human Pose Estimation model to obtain the time-dependent body keypoint data as the reference standard for evaluation. Finally, the video of the examinee's dancing actions is collected and imported into the Human Pose Estimation model to obtain the body keypoint data of the examinee's dancing actions, the similarity between it and the reference standard for evaluation is used for evaluating the standard level of dancing pose.

6 Claims, 3 Drawing Sheets

(51) Int. Cl.
*G06T 7/73* (2017.01)
*G06V 20/40* (2022.01)
*G06V 40/10* (2022.01)

(52) U.S. Cl.
CPC .. *G06V 40/103* (2022.01); *G06T 2207/30196* (2013.01)

(58) Field of Classification Search
CPC .. G06V 20/70; G06V 20/698; G06V 40/1365; G06V 40/23; G06V 40/103; G06V 10/34; G06N 20/00; G06N 3/08; G06T 2207/30196; G06T 2207/20084; G06T 2207/20081; G06T 2207/10016; G06T 2207/30221; G06T 7/75; G06T 7/246; G06T 7/73
See application file for complete search history.

(56) References Cited

U.S. PATENT DOCUMENTS

| | | | | |
|---|---|---|---|---|
| 2012/0218262 A1* | 8/2012 | Yomdin | ........... | G06T 13/40 345/473 |
| 2019/0335192 A1* | 10/2019 | Otto | ........... | G06N 20/10 |
| 2019/0347826 A1* | 11/2019 | Zhang | ........... | G06T 7/73 |
| 2021/0059565 A1* | 3/2021 | Morris | ........... | G06V 40/25 |
| 2021/0089761 A1* | 3/2021 | Tyomkin | ........... | A63B 69/3605 |
| 2022/0327714 A1* | 10/2022 | Cook | ........... | G06T 7/70 |

FOREIGN PATENT DOCUMENTS

| | | | |
|---|---|---|---|
| CN | 110633608 A | * | 12/2019 |
| CN | 110674794 A | * | 1/2020 |
| CN | 110705390 A | * | 1/2020 |
| CN | 111160085 A | * | 5/2020 |
| CN | 111950412 A | * | 11/2020 |
| WO | WO-2021099778 A1 | * | 5/2021 |

OTHER PUBLICATIONS

Real-Time Human Pose Recognition in Parts from Single Depth Images—2013 (Year: 2013).*
A Deep Learning Framework for Recognizing Both Static and Dynamic Gestures—2021 (Year: 2021).*
A Disentangled Recognition and Nonlinear Dynamics Model for Unsupervised Learning—2017 (Year: 2017).*
A Survey of Vision-Based Human Action Evaluation Methods—2019 (Year: 2019).*
Choreographic Pose Identification using Convolutional Neural Networks—2019 (Year: 2019).*

* cited by examiner

PROFESSIONAL DANCE EVALUATION METHOD FOR IMPLEMENTING HUMAN POSE ESTIMATION BASED ON DEEP TRANSFER LEARNING

BACKGROUND OF INVENTION

1. Field of the Invention

The present invention relates generally to a dance evaluation technique, and more particularly to a professional dance evaluation method for implementing Human Pose Estimation based on Deep Transfer Learning.

2. Description of Related Art

During the dance teaching of a professional dancing school, the general examination method is that the student performs a set of dancing action routine which has been learned and practiced, the examination teacher evaluates the performance according to the student's dancing routine actions. The main evaluating indicators include whether the body posture is correct or not, whether the actions are in time with the music or not and so on. However, in the actual examination, many students perform consecutively, it is difficult and tiresome for the examination teacher to visually observe all dancing action details of every student. Using machine learning method for intelligent detection of the standard level of the students' poses to assist the teachers in grading is an effective way to reduce the teachers' burden and increase the examination efficiency.

The research on using deep learning training model to implement real-time human pose estimation has progressed a lot in recent years. The principle is established on detecting such keypoints as main joints of human body in the image and connecting the limbs between keypoints to form some pose. The openpose, alphapose and deeppose models can obtain better recognition effects in different normal scenarios. The professional dancing poses often include some exaggerated body movements and a lot of body overlap and shielding actions, which are likely to induce missing recognition and misrecognition. Additionally, the model for professional dance evaluation is required of higher accuracy of pose recognition.

However, the aforesaid model is not designed for identifying professional dancing actions, it cannot implement accurate evaluation.

SUMMARY OF THE INVENTION

The fundamental purpose of the present invention is to provide a professional dance evaluation method for implementing Human Pose Estimation based on Deep Transfer Learning, which can evaluate the Human Pose Estimation and standard level of professional dancing actions, so as to assist the teachers in examining the students.

Therefore, in order to attain the aforesaid purpose, the present invention provides a professional dance evaluation method for implementing Human Pose Estimation based on Deep Transfer Learning, including the following steps. Step S1: combine the Transfer Learning principle of deep learning with the pose features of professional dance training to build a Human Pose Estimation model. Step S2: import the video of demonstration dancing actions into the Human Pose Estimation model to obtain the time-dependent body keypoint data as the reference standard for evaluation. Step S3: import the video of the examinee's dancing actions into the Human Pose Estimation model to obtain the body keypoint data of the examinee's dancing actions, the similarity between it and the reference standard for evaluation is used for evaluating the standard level of dancing pose.

BRIEF DESCRIPTION OF THE DRAWINGS

A preferred embodiment of the present invention is detailed with figures as follows, wherein.

DETAILED DESCRIPTION OF THE INVENTION

Figure 1:
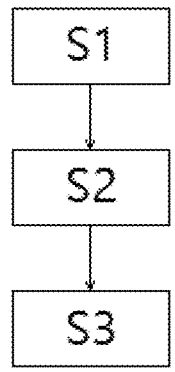
FIG. 1 is the flow chart of a preferred embodiment of the present invention.
Figure 2:
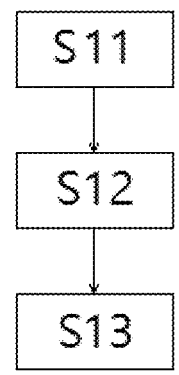
FIG. 2 is the flow chart of Step S1 in a preferred embodiment of the present invention.
Figure 3:
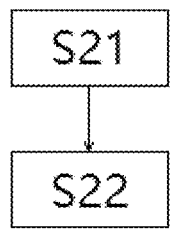
FIG. 3 is the flow chart of Step S2 in a preferred embodiment of the present invention.
Figure 4:
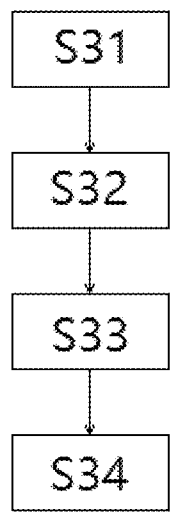
FIG. 4 is the flow chart of Step S3 in a preferred embodiment of the present invention.
Figure 5:
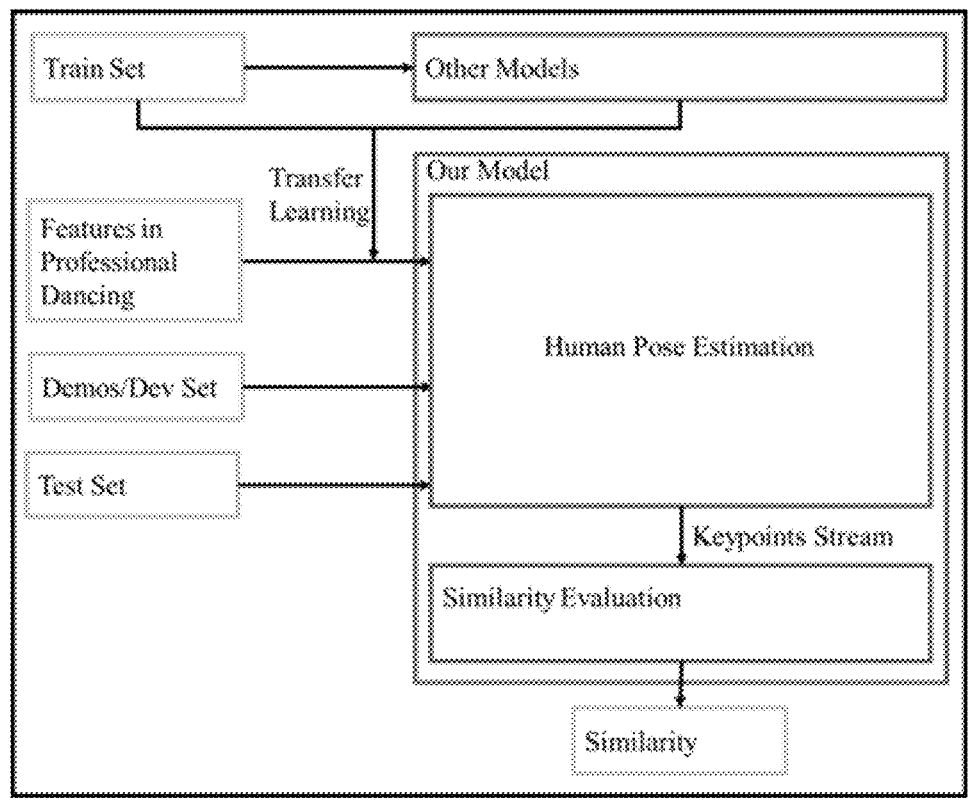
FIG. 5 is the model architecture diagram of a preferred embodiment of the present invention.
Figure 6:
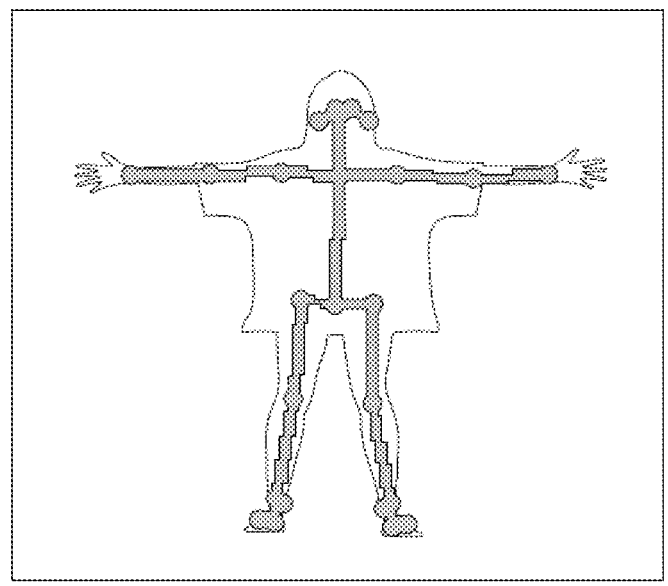
FIG. 6 is the schematic diagram of Human Pose Estimation.

Referring to FIG. 1 to FIG. 6 for the professional dance evaluation method for implementing Human Pose Estimation based on Deep Transfer Learning in a preferred embodiment of the present invention, the first step S1: the known Transfer Learning principle of deep learning is combined with the pose feature training of professional dance training to build a 2D single-objective Human Pose Estimation model, the Human Pose Estimation model can identify the angles and poses of the trunk, limbs, head, hands and feet of human body.

To be specific, the Step S1 includes:

Step S11: the pretrained CNN (Convolutional Neural Network) model and source domain Train set are selected;

Step S12: the Human Pose Estimation model is designed according to the requirement features of professional dance evaluation and the Transfer Learning training is performed;

Step S13: the performance of the Human Pose Estimation model is tested and optimized in the Dev set.

The second step S2 of the present invention: the video of demonstration dancing actions is collected and imported into the Human Pose Estimation model to obtain the time-dependent body keypoint data as the reference standard for evaluation. The body keypoint data is the time-dependent 2D body keypoint coordinate information, the coordinates are a set of relative coordinates using the center point of human body as reference.

To be specific, the Step S2 includes:

Step S21: the demonstration dance video is preprocessed by clipping and alignment; and Step S22: the demonstration dance video is imported into the Human Pose Estimation model to obtain the body keypoint data.

The third step S3 of the present invention: the video of the examinee's dancing actions is collected and imported into the Human Pose Estimation model to obtain the body keypoint data of the examinee's dancing actions, the similarity between it and the reference standard for evaluation is used for evaluating the standard level of dancing pose. To be specific, the Step S3 includes:

Step S31: the dance video to be evaluated is preprocessed by clipping and alignment;

Step S32: the dance video to be evaluated is imported into the Human Pose Estimation model to obtain the body keypoint information data;

Step S33: the body keypoint data of the dance to be evaluated are standardized by coordinate transformation; and Step S34: the processed body keypoint data of the dance to be evaluated and the body keypoint data of the demonstration dance are compared step by step according to temporal coincidence relation, so as to determine their similarity and to make evaluation. To be specific, the dance background audio time of the dance video to be evaluated and demonstration dance video is used as time axis, so that the processed dance to be evaluated and the body keypoint data of the demonstration dance can be compared step by step according to temporal coincidence relation.

To be specific, multiple standard demonstration dance videos with different contents collected from a professional dance academy are taken as examples. The available source data set for human pose estimation model training is used as source domain data set, the Deep Transfer Learning training is performed in the preset training network. The demonstration dance videos are used as Dev set, the model is optimized and improved according to the performance of model in the Dev set, till the recognition accuracy reaches the expectation. The demonstration dance videos are imported into the trained Human Pose Estimation model to obtain the body keypoint coordinate data, and these data are used as reference standard for evaluation.

Secondly, the dance video to be evaluated is collected by video equipment (the dancing action content to be evaluated shall be identical with the demonstration dance video), the body keypoint data of the video are exported from the trained Human Pose Estimation model.

The dance to be evaluated corresponds to the body keypoint data of the corresponding demonstration dance, and the body keypoint video of the dance to be evaluated is standardized, so that it is in the same coordinate system of the body keypoint data of the demonstration dance. The audio information of dance background is used as time axis, both keypoint information streams are aligned according to the corresponding time, the keypoint coordinate deviation is converted into similarity. The calculation of similarity has reasonable fault tolerance rate and can remove the data points with conscious errors. Finally, the total similarity of the entire dancing process is exported for evaluation.

Therefore, the advantages of the professional dance evaluation method for implementing Human Pose Estimation based on Deep Transfer Learning of the present invention include.

(1) High training efficiency, low cost: the 2D single-target Human Pose Estimation model is trained using the Deep Transfer Learning principle, the training efficiency is increased, and a few specialized training samples are required.

(2) Specialization: in comparison to the known real-time Human Pose Estimation model, the model in the present invention is particularly optimized in the application domain of professional dance examination and evaluation, including the pose details of hands, feet and head, the recognition accuracy of different dancing poses is increased, various limb overlap and limb shielding actions in the dancing process can be identified effectively.

(3) High universality: the influence of different dancers' statures and body types and shooting environments on evaluation can be reduced by standardization, and automatic alignment can be implemented according to audio, and the evaluation has a certain fault tolerance rate.

(4) Strong extensibility: it is convenient to be transferred to the human pose learning and evaluation problems in the video data in the domains of education, medical treatment, health and robot according to different application requirements, e.g. developing the dance evaluation system into personal side to assist the dance specialty examinees or learners in self-learning and self-examination according to the published dance demonstration, and into the health domain to assist the mobility impaired in rehabilitation or assist the sports amateurs in adjusting body posture during sports exercise. Additionally, it can be provided for humanoid robots to study the actions in human videos and the software and hardware development in other related domains. It has extensive application domains and a good prospect.

While the means of specific embodiments in the present invention have been described by reference drawings, numerous modifications and variations could be made thereto by those skilled in the art without departing from the scope and spirit of the invention set forth in the claims. The modifications and variations should be in a range limited by the specification of the present invention.

What is claimed is:

1. A professional dance evaluation method for implementing Human Pose Estimation based on Deep Transfer Learning includes the following steps:
   Step S1: a Transfer Learning principle of deep learning is combined with the pose features of professional dance training to build a Human Pose Estimation model,
   wherein in Step S1, a 2D single-objective Human Pose Estimation model is trained by using a Deep Transfer Learning principle;
   Step S2: a video of demonstration dancing actions is collected and imported into the Human Pose Estimation model to obtain time-dependent body keypoint data as the reference standard for evaluation; and
   Step S3: a video of the examinee's dancing actions is collected and imported into the Human Pose Estimation model to obtain the body keypoint data of an examinee's dancing actions, the similarity between the body key point data and the reference standard for evaluation is used for evaluating a standard level of dancing pose,
   wherein the Step S3 includes:
   Step S31: a dance video to be evaluated is preprocessed by clipping and alignment;
   Step S32: the dance video to be evaluated is imported into the Human Pose Estimation model to obtain the body keypoint information data;
   Step S33: the body keypoint data of the dance to be evaluated are standardized by coordinate transformation; and
   Step S34: a processed body keypoint data of the dance to be evaluated and the body keypoint data of a demonstration dance are compared step by step according to temporal coincidence relation, so as to determine differences between the dance to be evaluated and the demonstration dance,
   wherein in Step S34, a dance background audio time of the dance video to be evaluated and demonstration dance video is used as time axis, so that the processed dance to be evaluated and the body keypoint data of the demonstration dance can be compared step by step according to temporal coincidence relation.

2. The professional dance evaluation method for implementing Human Pose Estimation based on Deep Transfer Learning defined in claim 1, the Step S1 includes:
- Step S11: a pretrained CNN (Convolutional Neural Network) model and source domain Train set are selected;
- Step S12: the Human Pose Estimation model is designed according to a requirement features of professional dance evaluation and the Transfer Learning training is performed; and
- Step S13: a performance of the Human Pose Estimation model is tested and optimized in a development set.

3. The professional dance evaluation method for implementing Human Pose Estimation defined in claim 2, wherein in Step S1, the Human Pose Estimation model can identify angles and poses of a trunk, limbs, a head, hands and feet of human body.

4. The professional dance evaluation method for implementing Human Pose Estimation defined in claim 1, wherein the Step S2 includes:
- Step S21: the demonstration dance video is preprocessed by clipping and alignment; and
- Step S22: the demonstration dance video is imported into the Human Pose Estimation model to obtain the body keypoint data.

5. The professional dance evaluation method for implementing Human Pose Estimation defined in claim 4, wherein the body keypoint data is time-dependent 2D body keypoint coordinate information, the coordinates are a set of relative coordinates using a center point of human body as reference.

6. The professional dance evaluation method for implementing Human Pose Estimation defined in claim 1, wherein the body keypoint information of the dance to be evaluated and demonstration dance is aligned according to the corresponding time, the offset distance between the corresponding keypoint coordinates of the dance to be evaluated and demonstration dance is converted into similarity, finally, a total similarity in the entire dancing process is used for evaluating the dance.

* * * * *